(12) United States Patent
Lischka et al.

(10) Patent No.: US 9,013,176 B2
(45) Date of Patent: Apr. 21, 2015

(54) METHODS AND APPARATUS FOR SENSING A SUBSTRATE IN A LOAD CUP

(75) Inventors: David J. Lischka, Austin, TX (US); Jim K. Atkinson, Los Gatos, CA (US); Jonathan Paul Domin, Sunnyvale, CA (US); Andrew Liu, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 586 days.

(21) Appl. No.: 13/360,342

(22) Filed: Jan. 27, 2012

(65) Prior Publication Data

US 2013/0193956 A1    Aug. 1, 2013

(51) Int. Cl.
*G01B 7/14* (2006.01)
*G01B 7/02* (2006.01)

(52) U.S. Cl.
CPC ...................... *G01B 7/023* (2013.01)

(58) Field of Classification Search
CPC ........................................ G01B 7/003
USPC ...................... 324/207.15, 207.13
See application file for complete search history.

(56) References Cited

U.S. PATENT DOCUMENTS

| | | | |
|---|---|---|---|
| 6,227,946 B1 | 5/2001 | Gonzalez-Martin et al. | |
| 6,312,312 B1 | 11/2001 | Togawa et al. | |
| 6,520,839 B1 | 2/2003 | Gonzalez-Martin et al. | |
| 6,968,772 B2 | 11/2005 | Lin et al. | |
| 7,044,832 B2 | 5/2006 | Yilmaz et al. | |
| 7,811,153 B1 | 10/2010 | Blank et al. | |
| 7,887,392 B2 | 2/2011 | Franzen | |
| 2005/0227595 A1 | 10/2005 | Marquardt et al. | |
| 2007/0269986 A1 | 11/2007 | Kalenjan et al. | |
| 2008/0268753 A1 | 10/2008 | Ishikawa et al. | |

FOREIGN PATENT DOCUMENTS

| | | |
|---|---|---|
| KR | 10-2009-0098159 | 9/2009 |
| WO | WO 2010-062840 A2 | 6/2010 |

OTHER PUBLICATIONS

International Search Report and Written Opinion of International Application No. PCT/US13/021184 mailed Apr. 29, 2013.
International Preliminary Report on Patentability and Written Opinion of International Application No. PCT/US2013/021184 mailed Aug. 7, 2014.

*Primary Examiner* — Bot Ledynh
(74) *Attorney, Agent, or Firm* — Dugan & Dugan, PC

(57) ABSTRACT

Methods, apparatus, and systems are provided for detecting the presence of a substrate in a load cup. The invention includes a proximity sensor having a detection pad disposed below a contact surface of a load cup assembly and a target disposed on a lever member and adapted to move toward the detection pad when a substrate is placed on the lever member and adapted to move away from the detection pad when a substrate is removed from the lever member. Numerous additional aspects are disclosed.

21 Claims, 10 Drawing Sheets

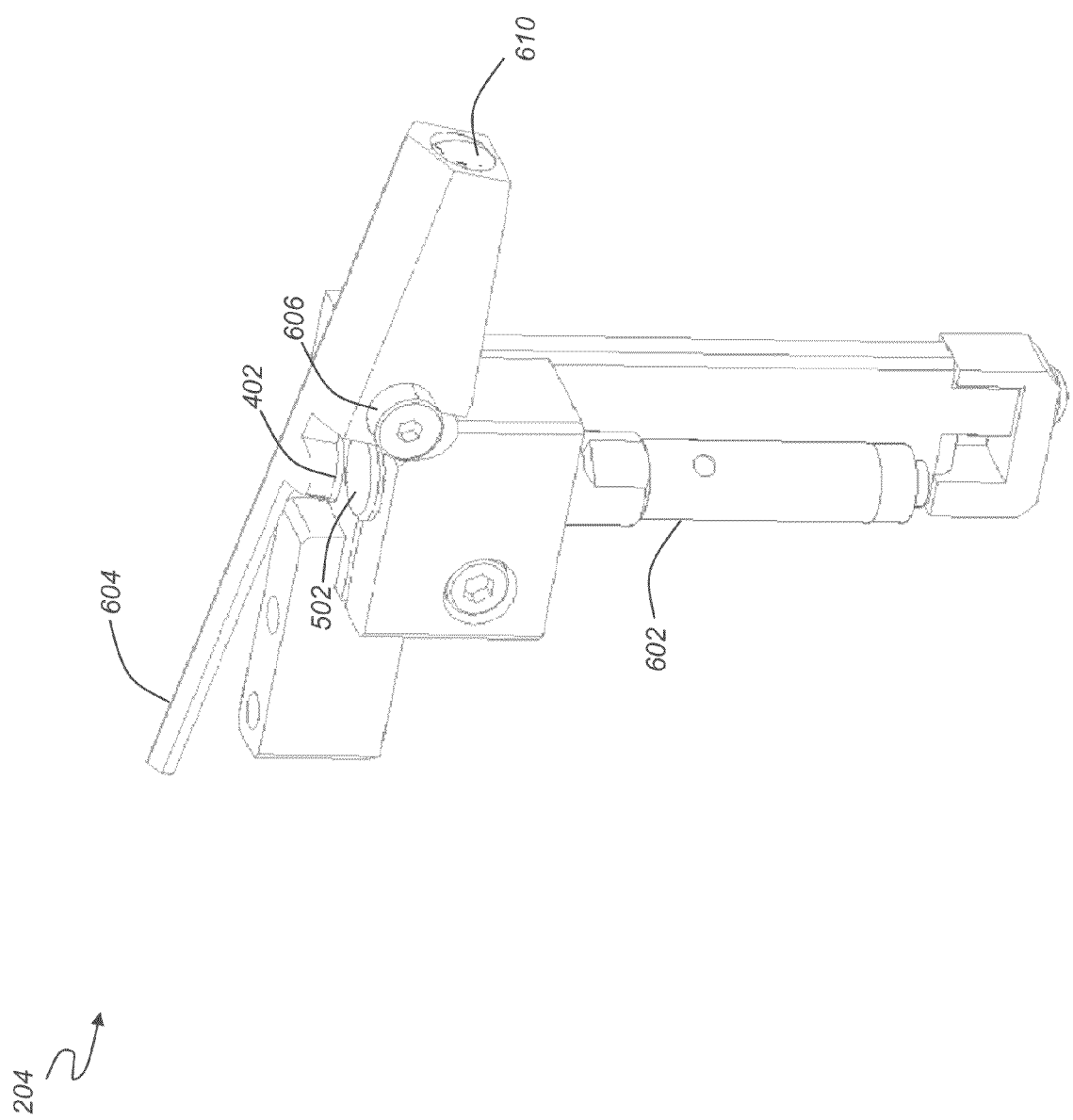

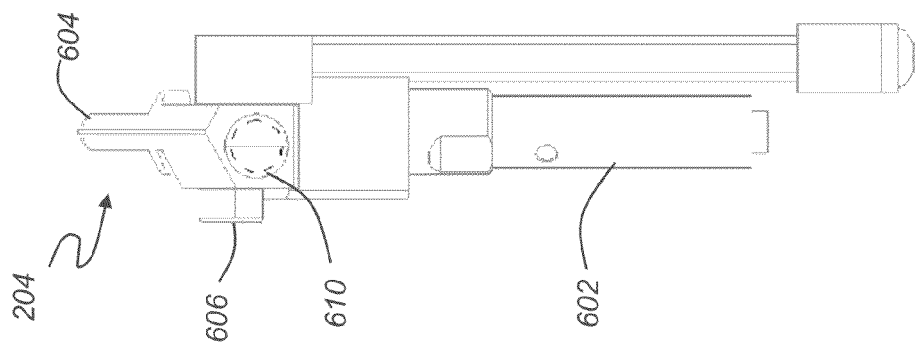
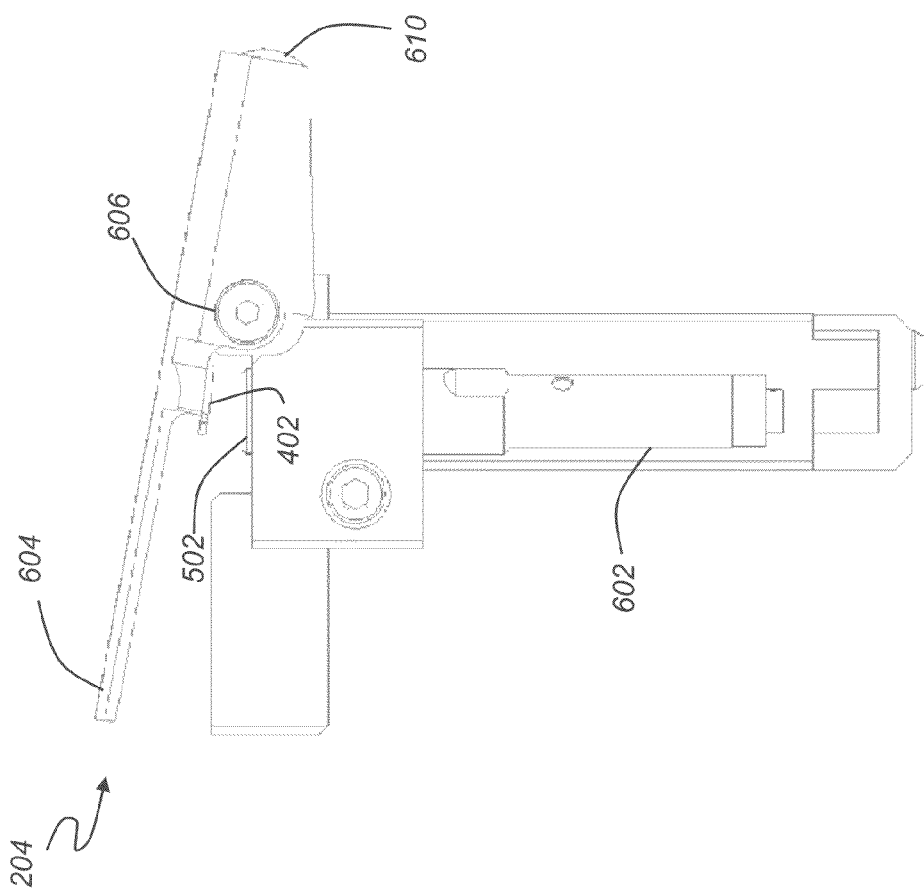

METHODS AND APPARATUS FOR SENSING A SUBSTRATE IN A LOAD CUP

FIELD OF THE INVENTION

The present invention generally relates to electronic device manufacturing, and more particularly is directed to methods and apparatus for sensing a substrate in a load cup.

BACKGROUND OF THE INVENTION

Load cups are used to ensure that a substrate is properly aligned and positioned so that a polishing head of a chemical-mechanical planarization (CMP) system can pick up the substrate properly. An example of such a CMP system including a load cup is described in detail in U.S. Pat. No. 7,044,832, issued May 16, 2006 to Yilmaz et al. which is hereby incorporated by reference for all purposes. Sensors are typically used to determine if a substrate is present within a load cup. However, due to a number of factors, the relatively low cost sensors that are typically used, may fail prematurely. Thus, what is needed are improved methods and apparatus for reliably sensing the presence of a substrate in a load cup that does not significantly increase the cost of manufacturing the CMP system.

SUMMARY OF THE INVENTION

Inventive methods and apparatus are provided for detecting the presence of a substrate in a load cup. In some embodiments, the apparatus includes a proximity sensor having a detection pad disposed below a contact surface of a load cup assembly; and a target disposed on a lever member and adapted to move toward the detection pad when a substrate is placed on the lever member and adapted to move away from the detection pad when a substrate is removed from the lever member.

In some other embodiments, a load cup system is provided. The load cup system includes a plurality of proximity sensors, each having a detection pad disposed below a contact surface of the load cup system; and a plurality of targets, each disposed on a different lever member associated with a different one of the plurality of proximity sensors and each target adapted to move toward the detection pad of an associated proximity sensor when a substrate is placed on the lever members. The targets are further adapted to move away from their associated detection pads when a substrate is removed from the lever members.

In yet other embodiments, a method of sensing a presence of a substrate in a load cup is provided. The method includes disposing a detection pad of a proximity sensor below a contact surface of a load cup assembly; moving a target disposed on a lever member toward the detection pad when a substrate is placed on the lever member; and moving the target away from the detection pad when a substrate is removed from the lever member.

Numerous other aspects are provided. Other features and aspects of the present invention will become more fully apparent from the following detailed description, the appended claims and the accompanying drawings.

BRIEF DESCRIPTION OF THE DRAWINGS

FIG. 6 is a magnified perspective diagram depicting an example substrate sensor for a load cup assembly according to embodiments of the present invention.

FIGS. 7A and 7B are side and back plan views of an example substrate sensor for a load cup assembly according to embodiments of the present invention.

DETAILED DESCRIPTION

The present invention provides methods and apparatus for improved sensing of a substrate in a load cup of a chemical-mechanical planarization (CMP) system. The inventors of the present invention have determined that the actual life span of sensors in existing load cup designs have been significantly shorter than the expected life cycle. This premature failure of the sensors frequently results from fluid penetration into the electrical switches typically used as substrate presence sensors. This occurs within a few months of use even when the enclosure for the switch has an ingress protection (IP) rating of IP67 which specifies tolerance of immersion of up to a depth of 1m for 30 minutes. While a higher IP rating may be used, such a solution may not be cost effective and may only add cost without addressing other potential factors such as corrosion resistance, gasket aging, construction tolerances, etc. Therefore, the present invention replaces the microswitches that are used in conventional load cups with proximately sensors which are non-contacting sensors and such sensors eliminate the possibility of water infiltration to the sensor electronics.

Figure 1:
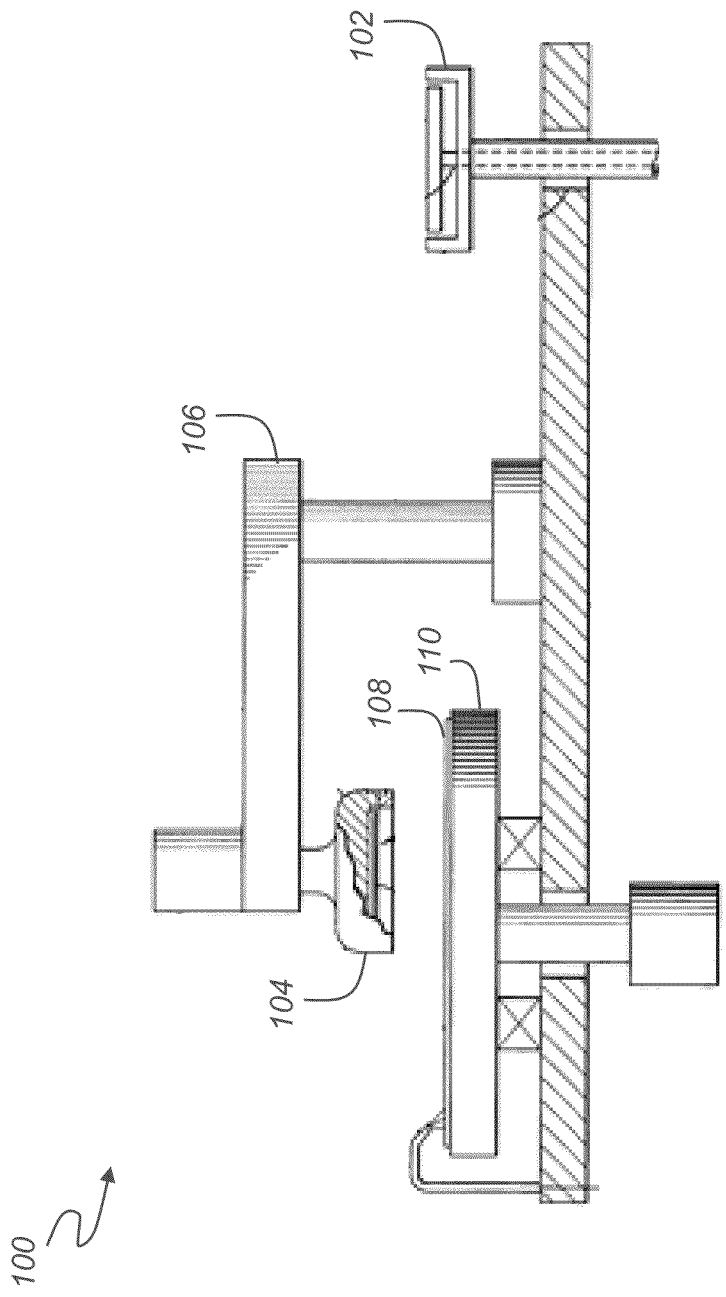
FIG. 1 is a diagram depicting a side view of an example chemical-mechanical planarization (CMP) system for polishing substrates according to embodiments of the present invention.

Turning to FIG. 1, a side view of an example chemical-mechanical planarization (CMP) system 100 for polishing substrates is shown. The system 100 includes a load cup assembly 102 for receiving a substrate to be polished and for holding the substrate in place for a polishing head 104 to pick up. The polishing head 104 is supported by an arm 106 that is operative to move the head 104 between the load cup assembly 102 and a polishing pad 108 on a rotating platen 110. In operation, the head 104 picks up the substrate from the load cup assembly 102 and carries it to the polishing pad 108. As the polishing pad 108 is rotated on the platen 110, the head 104 rotates and pushes the substrate down against the polishing pad 108.

Figure 2:
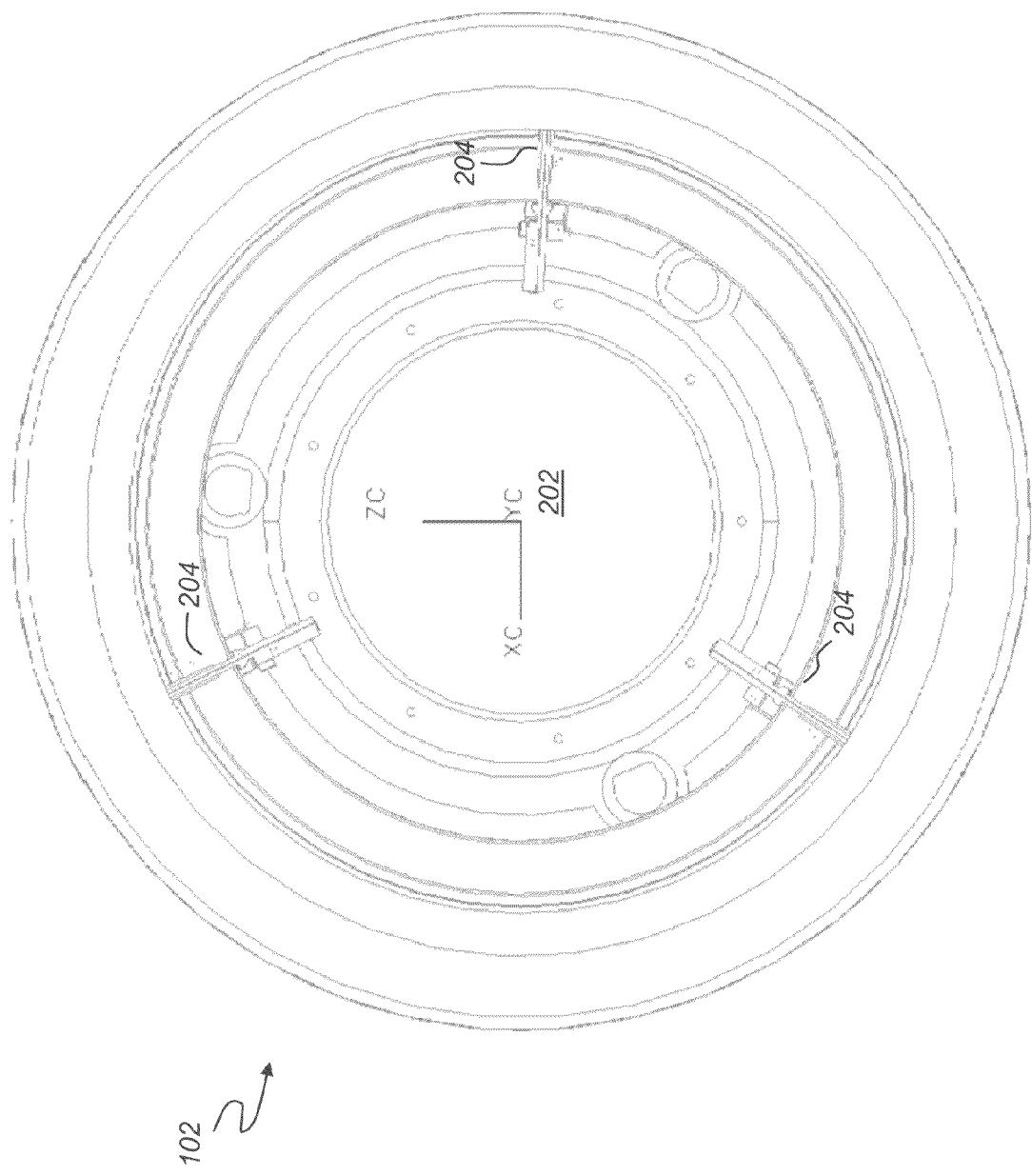
FIG. 2 is a schematic diagram depicting a top view of an example substrate load cup assembly of a CMP system according to embodiments of the present invention.

In order for the head 104 to properly pick up the substrate from the load cup assembly 102, the substrate should be properly seated within the load cup assembly 102. Turning to FIG. 2, a top view of an example substrate load cup assembly 102 is shown. The substrate is ideally seated flush and level on the contact surface 202 of the load cup assembly 102 to ensure that the polishing head 104 can reliably and securely pick up the substrate. In order to determine if a substrate is properly seated in the load cup assembly 102, an arrangement of one or more sensors 204 are provided below the contact surface 202 of the load cup. As shown in the example embodiment of FIG. 2, three sensors 204 may be used in some embodiments and they may be disposed in a radial pattern about the center of the load cup assembly 102. In other embodiments, one, two, four, five or more sensors 204 may be used and they may be disposed in similar or other arrangements.

Figure 3:
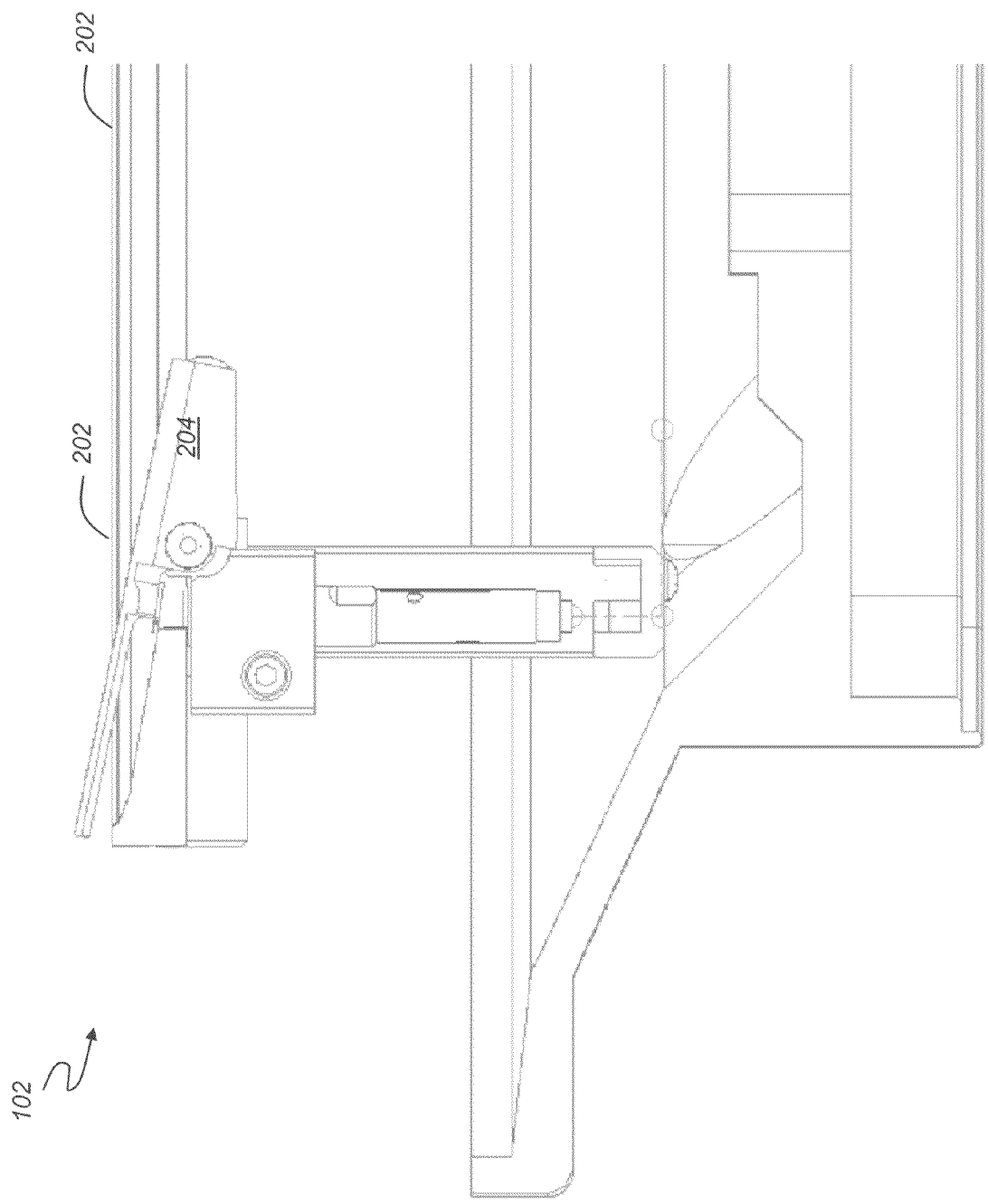
FIG. 3 is a side view, partial cross-sectional diagram depicting an example substrate load cup assembly of a CMP system according to embodiments of the present invention.
Figure 4:
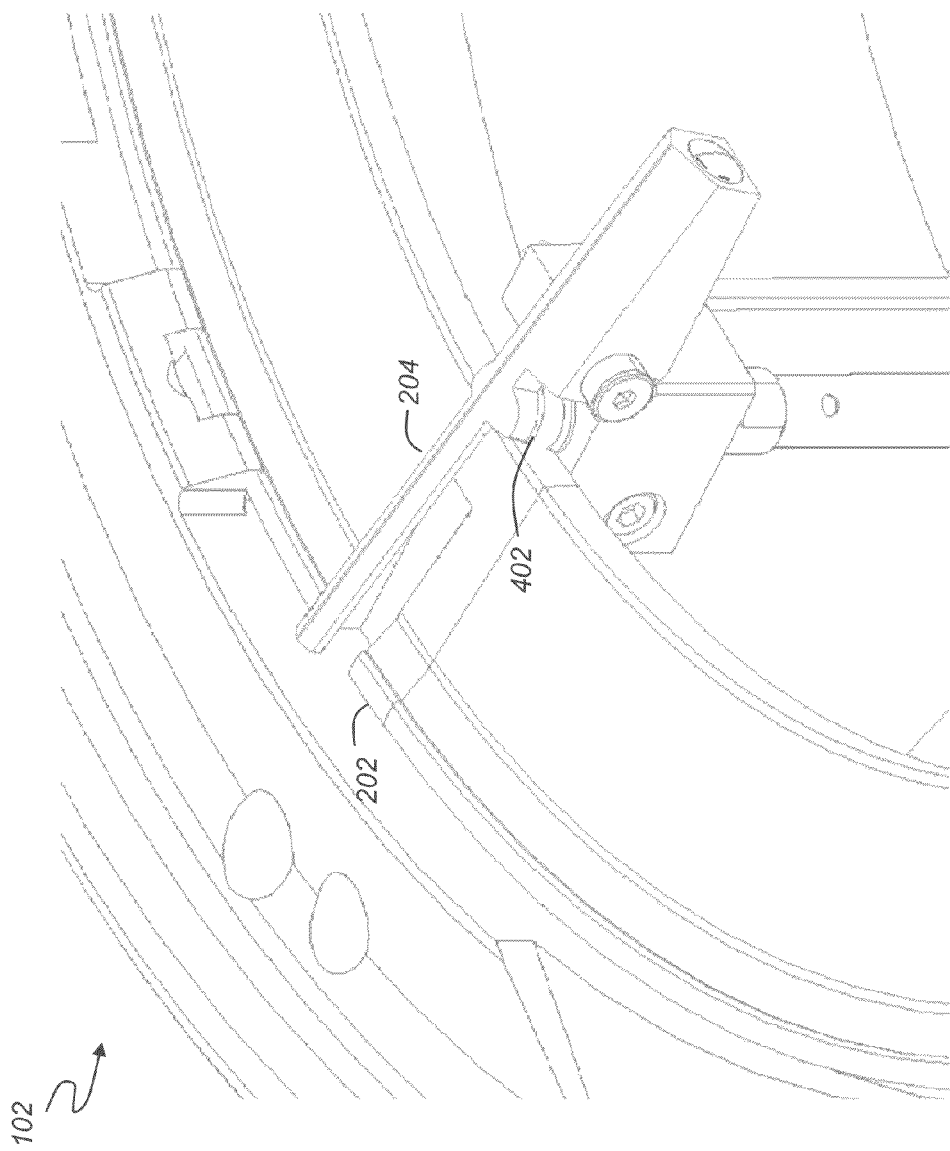
FIG. 4 is a magnified perspective diagram depicting a portion of an example substrate load cup assembly according to embodiments of the present invention.
Figure 5:
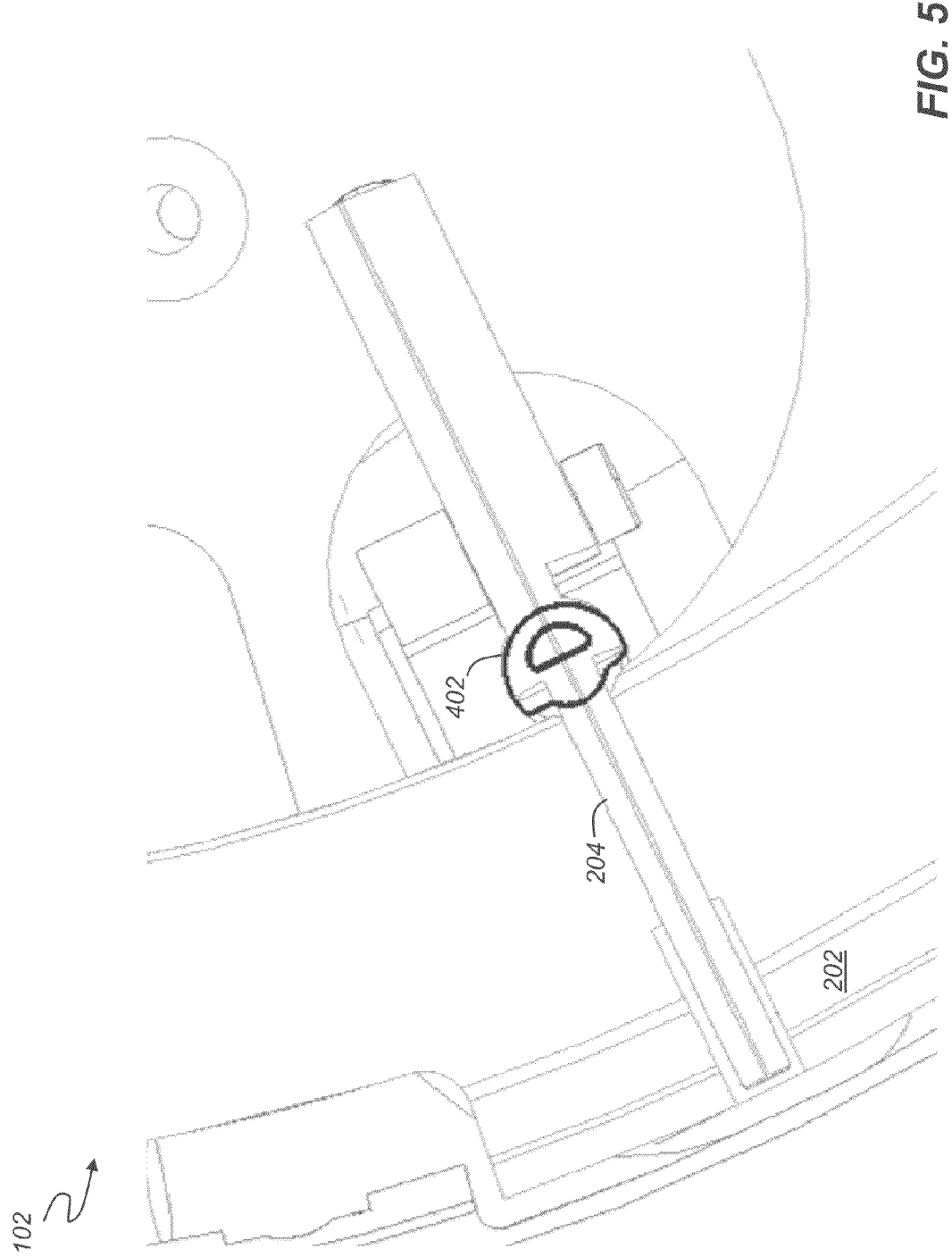
FIG. 5 is a magnified schematic diagram depicting a top view of an example substrate sensor in a load cup assembly according to embodiments of the present invention.

Turning to FIG. 3, a partial, cross-sectional side view of the example load cup assembly 102 of FIG. 2 is shown. Of note is that the sensor 204 includes a portion that is below the substrate contact surface 202 and a portion that extends upwardly above the level of the contact surface 202 when a substrate is not present. Turning to FIG. 4, a perspective view of the sensor 204 in the load cup assembly 102 is shown. Note that the sensor 204 includes a target 402 that moves toward a detection pad 502 (FIG. 5) when a substrate is placed on the sensor 204. FIG. 5 is a magnified top view of a sensor 204 within the load cup assembly 102. In bold outline the relative position and area of a target 402 is indicated. The target 402 includes material such as, for example, stainless steel that can be detected when brought into proximity of the detection pad 502 which houses the electronics of the proximity detection component of the sensor 204. More details of the operation of the sensor 204 are described below with respect to FIGS. 6 through 8.

Turning now to FIGS. 6, 7A and 7B, a perspective view, a side view, and a rear view (respectively) of the sensor 204 are shown without the load cup assembly 102. The sensor 204 includes a proximity sensor 602 that is held in place below an elongated lever member 604 which pivots about a fulcrum 606 so that the target 402 moves toward the detection pad 502 under the weight of a substrate. A counter-weight 610 is used to bias the lever member 604 in an up position when no substrate is present. Other biasing means such as springs, magnets, etc. may be use.

The proximity sensor 602 may be any practicable sensor (e.g., an inductive proximity sensor) capable of detecting the target 402 being within approximately 0.1 mm to approximately 1 mm of the detection pad 502. For example, a model number Bi1-EG05-AN6X sensor manufactured by Turck, Inc. in Plymouth, Minn., USA may be used. The face of the detection pad 502 may be stainless steel and proximity sensor 602 may be housed in stainless steel. Other materials may be used. The proximity sensor 602 may be held in place with set screws or other adjustable fastening means to allow easy calibration and positioning of the proximity sensor 602.

As can most clearly seen in FIG. 7A, the lever member 604 may have a peaked top surface to minimize contact with the substrate. This shape avoids damage to the substrate and prevents fluids or particles from being trapped between the lever member 604 and the substrate. The length of lever member 604, from tip to pivot point, may be in the range of approximately 38 mm to approximately 42 mm for a load cup assembly 102 designed to hold a 300 mm substrate. Other lengths may be used and in particular, other lengths may be used for different sized substrates.

At the base of the lever member 604, the target 402 is positioned so that the target 402 approaches the detection pad 502 when the lever member 604 is pressed down by a substrate. The weight of the target 402 and the lever member 604 together are less than the counter-weight 610 disposed on the opposite side of fulcrum 606. In some embodiments, counter-weight 610 is in the range of approximately 4 g to approximately 4.5 g for a load cup assembly 102 with three sensors 204 and designed to hold a 300 mm substrate.

Note that the lever member 604 is ideally biased up with sufficient force to cause the target 402 to move out of range of the detection pad 502 when no substrate is present or the substrate is not properly seated within the load cup assembly 102. And, when a substrate is present and properly seated, the biasing force on the lever member 604 from the counter-weight 610 is insufficient to prevent the weight of the substrate from pushing the target 402 within sensing range of the detection pad 502.

In some embodiments, the proximity sensors 602 in the sensors 204 of the load cup assembly 102 may be adapted to generate a signal indicating the detection of a substrate on the lever member 604 and/or the absence of a substrate on the lever member 604. Together or individually, a plurality of sensors 204 disposed with the load cup assembly 102 of the present invention may be used to determine the presence and proper positioning of a substrate within the load cup assembly 102. In some embodiments, the sensors 204 may be coupled to a controller (not shown) that may be adapted to receive signals from the sensors 204.

Figure 8:
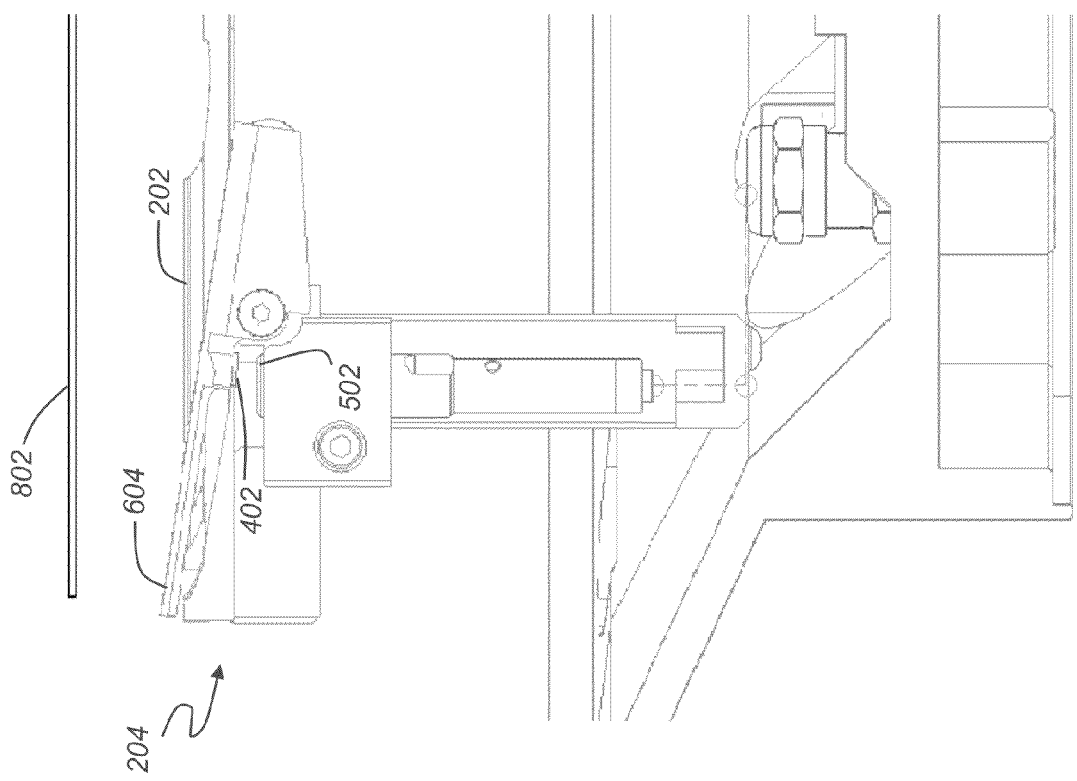
FIG. 8 is a side view of an example substrate sensor for a load cup assembly with a substrate above the load cup assembly according to embodiments of the present invention.

Turning now to FIG. 8, a side view of a substrate sensor 204 for a load cup assembly 102 is shown with a substrate 802 above the load cup assembly 102. The substrate 802 is positioned to be deposited into the load cup assembly 102, for example, using a substrate handling robot (not shown) or the polishing head 104 of the CMP system 100. Note that the lever member 604 is biased in the up position above the contact surface 202 of the load cup assembly 102 so that the target 402 is out of sensing range of the detection pad 502. An opening in the contact surface 202 is provided to allow the lever member 604 to tilt up above the contact surface 202 to receive a substrate. In some embodiments, the lever member 604 in the up position is disposed at an angle of approximately 13 degrees off of a horizontal plane parallel to the contact surface 202. Other angles may be used. The lever member 604 is also disposed to contact the substrate only in the edge exclusion region of the substrate to prevent damage to any structures on the major surface of the substrate.

Figure 9:
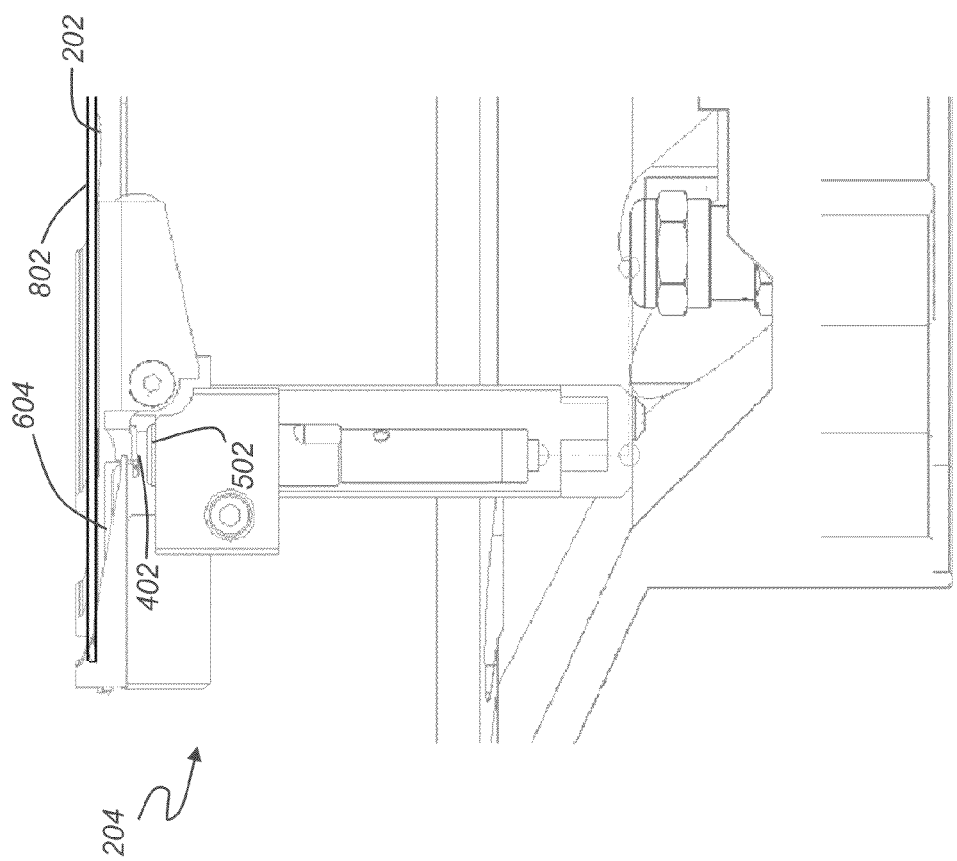
FIG. 9 is a side view of an example substrate sensor for a load cup assembly with a substrate in the load cup assembly according to embodiments of the present invention.

Turning now to FIG. 9, the same view of the sensor 204 as FIG. 8 is shown but now the substrate is resting on the contact surface 202 of the load cup assembly 102. The lever member 604 is forced down into an approximately horizontal position by the weight of the substrate so that the target 402 is within sensing range of the detection pad 502.

Figure 10:
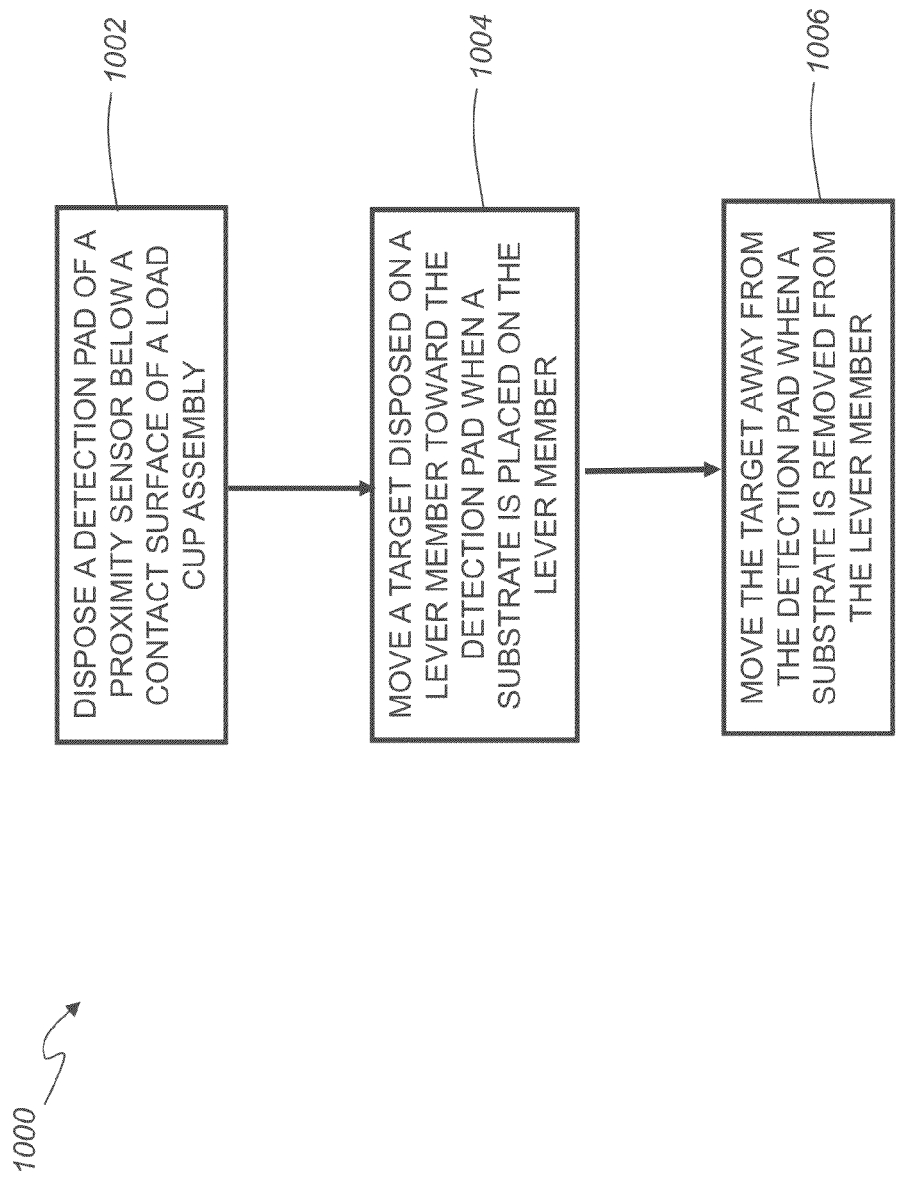
FIG. 10 is flowchart depicting an example method of detecting the presence of a substrate in a load cup assembly according to embodiments of the present invention.

Turning now to FIG. 10, an example method 1000 of detecting the presence of a substrate in a load cup assembly 102 is depicted in a flowchart. In step 1002, a detection pad 502 of a proximity sensor 602 is disposed below the contact surface 202 of a load cup assembly 102. In step 1004, a target 402 disposed on the lever member 604 of the sensor 204 is moved toward the detection pad 502 when a substrate 802 is placed on the lever member 604. In step 1006, the target 402 is moved away from the detection pad 502 when a substrate 802 is removed from the lever member 604. The lever member 604 is biased up in a first position (FIG. 8) when a substrate is not on the lever member and the target 402 is out of the detection range of the proximity sensor 602 when the lever member 604 is in the first position. The lever member 604 is biased down in a second position (FIG. 9) by the weight of the substrate 802 when the substrate 802 is on the lever member 604 and the target 402 is within the detection range of the proximity sensor 602 when the lever member 604 is in the second position. The target 402 is moved away from the detection pad 502 when a substrate 802 is removed from the lever member 604. The target 402 is moved by a counter-weight 610 or other biasing means also disposed on the lever member 604.

Accordingly, while the present invention has been disclosed in connection with the preferred embodiments thereof, it should be understood that other embodiments may fall within the spirit and scope of the invention, as defined by the following claims.

The invention claimed is:

1. An apparatus for detecting a substrate in a load cup, the apparatus comprising:
    a proximity sensor having a detection pad disposed below a contact surface of a load cup assembly; and
    a target disposed on a lever member and adapted to move toward the detection pad when a substrate is placed on the lever member and adapted to move away from the detection pad when a substrate is removed from the lever member.

2. The apparatus of claim 1 wherein the lever member is biased in a first position when a substrate is not on the lever member.

3. The apparatus of claim 2 wherein the target is out of a detection range of the proximity sensor when the lever member is in the first position.

4. The apparatus of claim 1 wherein the lever member is biased in a second position when a substrate is on the lever member.

5. The apparatus of claim 4 wherein the target is within a detection range of the proximity sensor when the lever member is in the second position.

6. The apparatus of claim 1 wherein the lever member includes a peaked top surface adapted to contact a substrate.

7. The apparatus of claim 1 wherein the target is moved away from the detection pad when a substrate is removed from the lever member and wherein the target is moved by a counter-weight also disposed on the lever member.

8. A load cup system comprising:
    a plurality of proximity sensors, each having a detection pad disposed below a contact surface of the load cup system; and
    a plurality of targets, each disposed on a different lever member associated with a different one of the plurality of proximity sensors and each target adapted to move toward the detection pad of an associated proximity sensor when a substrate is placed on the lever members, and
    wherein the targets are further adapted to move away from their associated detection pads when a substrate is removed from the lever members.

9. The system of claim 8 wherein the lever members are each biased in a first position when a substrate is not on the lever members.

10. The system of claim 9 wherein the targets are out of a detection range of their associated proximity sensor when the associated lever members are each in the first position.

11. The system of claim 8 wherein the lever members are each biased in a second position when a substrate is on the lever members.

12. The system of claim 11 wherein the targets are each within a detection range of their associated proximity sensor when their associated lever member is in the second position.

13. The system of claim 8 wherein the lever members include a peaked top surface adapted to contact a substrate.

14. The system of claim 8 wherein the targets are each moved away from their associated detection pad when a substrate is removed from the lever members and wherein the targets are moved by counter-weights also disposed on the lever members.

15. The system of claim 8 wherein three proximity sensors are disposed equidistant and radially around the contact surface of the load cup system.

16. A method of sensing a presence of a substrate in a load cup, the method comprising the steps of:
    disposing a detection pad of a proximity sensor below a contact surface of a load cup assembly;
    moving a target disposed on a lever member toward the detection pad when a substrate is placed on the lever member; and
    moving the target away from the detection pad when a substrate is removed from the lever member.

17. The method of claim 16 wherein the lever member is biased in a first position when a substrate is not on the lever member.

18. The method of claim 17 wherein the target is out of a detection range of the proximity sensor when the lever member is in the first position.

19. The method of claim 16 wherein the lever member is biased in a second position when a substrate is on the lever member.

20. The method of claim 19 wherein the target is within a detection range of the proximity sensor when the lever member is in the second position.

21. The method of claim 16 wherein the target is moved away from the detection pad when a substrate is removed from the lever member and wherein the target is moved by a counter-weight also disposed on the lever member.

* * * * *